US005896520A

United States Patent [19]
Ohminato et al.

[11] Patent Number: 5,896,520
[45] Date of Patent: Apr. 20, 1999

[54] VIRTUAL COMPUTER SYSTEM OF MULTI-PROCESSOR CONSTITUTION

[75] Inventors: Takeshi Ohminato; Koichi Shinohara; Katsuichi Aoki, all of Hadano, Japan

[73] Assignees: Hitachi, Ltd., Tokyo; Hitachi Information Technology Co., Ltd., Kanagawa-ken, both of Japan

[21] Appl. No.: 08/781,211

[22] Filed: Jan. 10, 1997

[30] Foreign Application Priority Data

Jan. 11, 1996 [JP] Japan .................. 8-003347

[51] Int. Cl.$^6$ .................................. G06F 9/40
[52] U.S. Cl. .......................... 395/406; 711/159
[58] Field of Search ................ 711/207, 6, 159; 395/406, 672, 678, 826

[56] References Cited

U.S. PATENT DOCUMENTS

| | | | |
|---|---|---|---|
| 4,849,881 | 7/1989 | Eguchi | 711/205 |
| 5,317,705 | 5/1994 | Gannon | 711/6 |
| 5,428,757 | 6/1995 | Sutton | 395/677 |
| 5,574,936 | 11/1996 | Ryba | 395/406 |

FOREIGN PATENT DOCUMENTS 6-103092  4/1994  Japan .

OTHER PUBLICATIONS

"Instructions for the HITAC M Series Processors (M/ASA)," (8080-2-146, p. 253).

Primary Examiner—Eric Coleman
Attorney, Agent, or Firm—Fay, Sharpe, Beall, Fagan, Minnich & McKee

[57] ABSTRACT

A virtual computer system of a multi-processor arrangement reduces the overhead of XPTLB processing. The processing of a PTLB (translation look-aside buffer processing) is controlled using IP dispatch information about virtual computers that is stored a hardware share area (HSA). A control unit (CU) has a group of bit-map BIM (broadcast IP mask) latches which correspond to the configured IP's and in which the IP dispatch information is set upon purging of a translation look-aside buffer. Through AND gate logic provided in the CU, whether or not an IP is to receive a PTLB request is determined on the basis of the information set in the BIM masks. Specifically, the AND gates compute the logical AND of each of the BIM masks with the control line of a XPTLB REQ from an IP being dispatched by a particular virtual computer. The AND gates provide an XPTLB REQ output designating PTLB processing to the other IP's if the associated BIM mask is set in accordance with IP dispatch information indicating that an IP has been dispatched by that particular virtual computer in the past.

10 Claims, 5 Drawing Sheets

VIRTUAL COMPUTER SYSTEM OF MULTI-PROCESSOR CONSTITUTION

FIELD OF THE INVENTION

The present invention relates to a virtual computer system for multi-processors. More particularly, the invention relates to a virtual computer system for a multi-processor system with each processor having a translation look-aside buffer (abbreviated to TLB hereunder) for translating logical addresses to real addresses at high speed.

BACKGROUND OF THE INVENTION

Virtual computer systems having a virtual computer implemented within a physical computer setup have been gaining widespread acceptance. In this connection, it is possible within the physical environment of a multi-processor system having numerous physical computers to provide virtual computers. Such virtual computers of multi-processor systems exist by utilizing logically partitioned resources. In other words, a plurality of physical computers making up the multi-processor system are logically partitioned and are shared by a plurality of virtual computers.

One such example of the prior art means for implementing such virtual computers is disclosed in Japanese Patent Laid-Open No. Hei 6-103092. The disclosure involves assigning all resources that were allocated to a first virtual computer, to a second virtual computer dynamically and collectively without initializing the first virtual computer again.

In the single or multiple processor setup wherein each processor has a TLB, it becomes necessary to erase specific entries from that TLB. An example of conventional techniques for erasing specific entries of a TLB is the use of an IPTE instruction as explained in "Instructions for the HITAC M Series Processors (M/ASA)" (8080-2-146, p. 253) issued by Hitachi, Ltd.

The IPTE instruction is used to erase TLB entries applicable to specific conditions. In a tightly-coupled multi-processor environment, the IPTE instruction erases the TLB entries that meet specific conditions in all data processors making up the multi-processor structure.

FIG. 4 is a flowchart of steps depicting how the IPTE instruction is conventionally executed by each of a plurality of data processors in a multi-processor system. The multi-processor setup of FIG. 4 comprises a large number of instruction processors IP0 through IPn (each referred to as an IP) and a control unit (referred to as a CU). In the example shown in FIG. 4, the IP0 is shown executing the IPTE instruction. The flow of the processing involved is described below.

(1) In carrying out the IPTE instruction, the IP0 first issues a RESERVE request to the CU preparatory to performing PTLB processing (called XPTLB hereinafter) on the other IP's (i.e., IP1 through IPn). The RESERVE request is a request for priority to avoid contention with the other IP's issuing XPTLB requests (step 201).

(2) Upon receipt of the RESERVE request, the CU checks to see if it is possible to issue an XPTLB request to the other IP's, i.e., if the other IP's are in XPTLB processing or are issuing any RESERVE request to the CU preparatory to XPTLB processing. The result is reported to the IP0 (steps 202 and 203).

(3) If the processing of the RESERVE request from the IP0 is found to be possible, the CU issues an XPTLB REQ (step 204) to all other IP's (IP1 through IPn in the example of FIG. 4).

(4) The IP1 through the IPn are currently executing their assigned tasks. Upon receipt of the XPTLB REQ from the CU, the IP's stop their ongoing task processing and start XPTLB processing. At the same time, the IP's send an XPTLB START report to the CU telling the latter that the XPTLB processing has started (steps 205, 207, 206 and 208).

(5) On receiving the XPTLB START report from all IP's, the CU sends an ALL XPTLB START report to the IP0, which originated the XPTLB REQ, telling the latter that the XPTLB processing has been started by all IP's (step 209).

(6) Meanwhile, after issuing the RESERVE request to the CU, the IP0 waits for a report from the CU. If the attempt to reserve has failed, the IP0 returns to step 101 and issues another RESERVE request to the CU. If the reserve attempt is successful, the IP0 waits for an ALL XPTLB START request from the CU. When the request is received, the IP0 executes its own PTLB processing. At the end of the PTLB processing, the IP0 sends a PTLB END report to the CU and terminates the processing (steps 210 through 212).

(7) Upon receipt of the PTLB END report from the IP0, the CU sends to all other IP's a PTLB END report indicating that the PTLB processing by the IP0, the originator of the XPTLB REQ, has ended, and terminates the processing (step 213).

(8) The IPTE instruction is an instruction that inhibits the reference to any TLB entry area by any other IP except the IP that issued the instruction, the inhibition lasting until the latter IP terminates its processing. Thus the IP1 through IPn wait in a loop for a PTLB END report from the CU. When the PTLB END report is received, the IP's resume processing of their tasks (steps 214 and 215).

SUMMARY OF THE INVENTION

If the processing of the IPTE instruction by the above-described conventional technique is applied to a virtual computer system of a multi-processor constitution, the execution of the IPTE instruction by one virtual computer will broadcast XPTLB to all IP's configured. Even if the virtual computer in question currently shares only one IP, all other IP's will be sent the XPTLB REQ.

In principle, the IP executing the XPTLB processing need only be the one which was dispatched in the past or is currently dispatched as the virtual computer in question. If the above-described conventional technique is applied, all IP's shared by the virtual computer will be forced to carry out the XPTLB processing. This can result in a significant decline in the performance of the virtual computer system.

It is therefore an object of the present invention to overcome the above and other deficiencies and disadvantages of the prior art and to provide a virtual computer system of a multi-processor constitution capable of minimizing the overhead of XPTLB processing and thereby enhancing the performance of the system.

In carrying out the invention and according to one aspect thereof, there is provided a virtual computer system of a multi-processor constitution comprising a plurality of data processors. Each of the data processors includes a translation look-aside buffer having a plurality of entries, each of the entries accommodating a logical address paired with a real address. The real address is previously translated into the logical address by use of an address translation table for matching real addresses in a real storage device with logical addresses. Each of the data processors further functions to retain dispatch information indicating whether or not the data processor in question has ever been dispatched by a virtual computer; and further functions upon receipt of a translation look-aside buffer purge request issued by a data processor dispatched by one virtual computer, the determining means to determine or identify another data processor which is to issue another translation look-aside buffer purge request. The dispatch information may be retained in a hardware share area (HSA) of a main storage, and the determining function may be executed by a control unit (CU) for controlling the virtual computer system as a whole.

As described, according to an embodiment of the invention, the HSA accommodates IP dispatch information matched with virtual computers, and has a group of BIM (broadcast IP mask) latches which corresponds to each of the IP's and in which the IP dispatch information is set. In this setup, when the CU receives a TLB purge request from a virtual computer, the CU has IP dispatch information latched in the BIM latch group. Based on the latched IP dispatch information and on the TLB purge request included in the information from the virtual computer in question, the CU determines the data processor which is to issue another TLB purge request. These arrangements allow the virtual computer system to enhance the performance of each virtual computer without being affected by the overhead of the XPTLB processing by the other virtual computers.

DETAILED DESCRIPTION OF THE PREFERRED EMBODIMENTS

Figure 1:
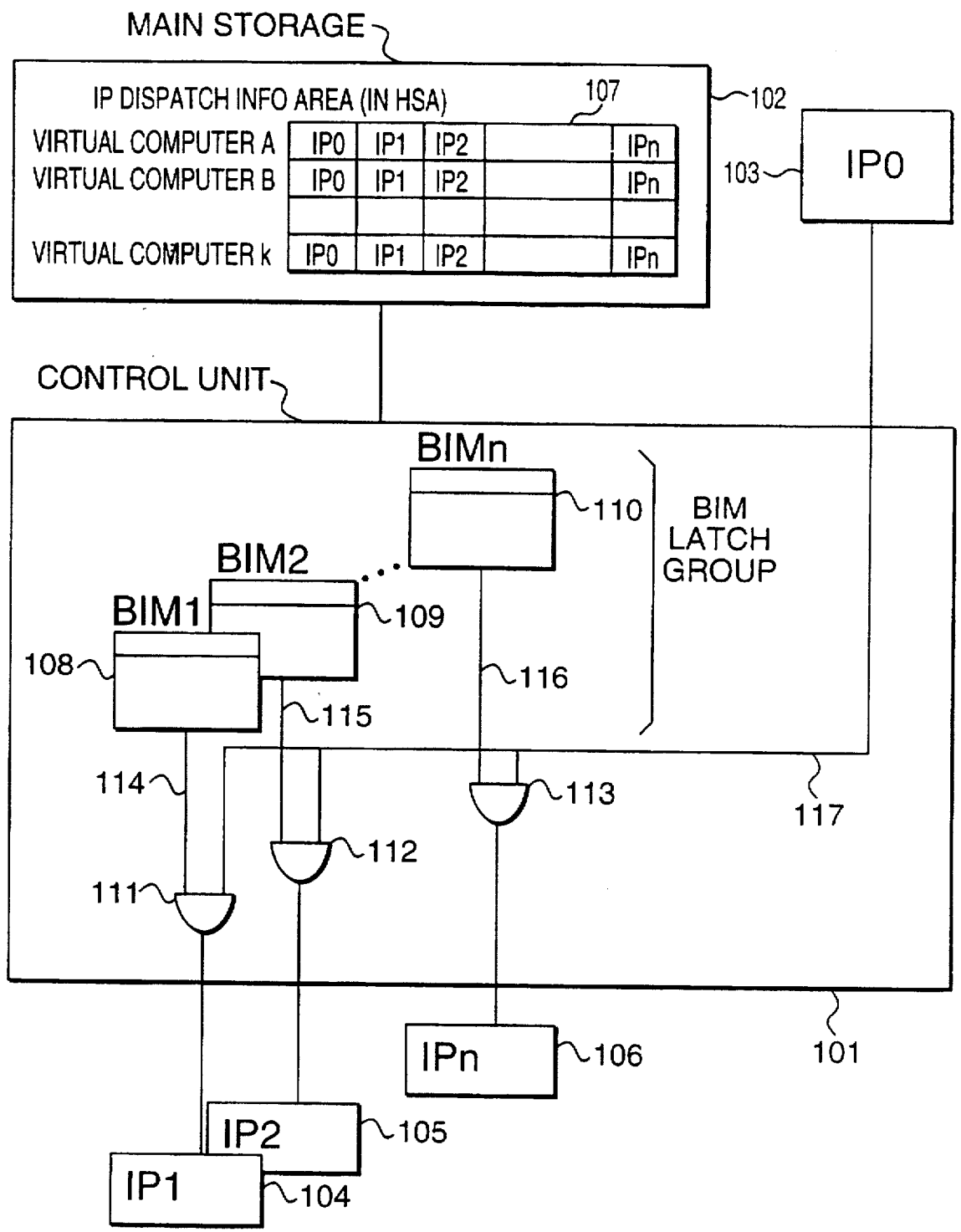
FIG. 1 is a schematic view of a virtual computer system for a multi-processor arrangement according to a preferred embodiment of the invention.

FIG. 1 is a schematic diagram of a virtual computer system for a multi-processor arrangement according to a preferred embodiment of the invention. In FIG. 1, a plurality of processors IP0-IPn (104-106) are shown connected to a control unit CU. The CU has broadcast IP mask latches BIM1 through BIMn. Also, the Cu has a main storage 102 that includes an IP dispatch information matrix, and AND gates 111 through 113.

The plurality of data processors IP0 through IPn are dispatched by virtual computers A, B ... k. The CU controls the system as a whole, and the main storage 102 to be shared by the IP's. The CU controls each of the configured IP's individually, controls exchanges of requests and data with the IP's, and processes data being used. The main storage 102 includes a software use area (SUA, not shown) opened to accommodate software, and a hardware share area (HSA) for use in hardware control and other operations. Processors IP1 through IPn are data processors each including a translation look-aside buffer (TLB) for translating logical addresses to real addresses at high speed. The IP's share the main storage 102.

The IP dispatch information matrix 107 is allocated in the HSA inside the main storage 102. The matrix indicates the IP's dispatched by each of a plurality of virtual computers implemented in the multi-processor arrangement. In FIG. 1, the IP dispatch information matrix 107 indicates in a bit-for-IP field arrangement those of the instruction processors IP0 through IPn which have been dispatched by each of virtual computers A through k.

The IP mask latches BIM1 through BIMn receive from the matrix 107 the IP dispatch information about the virtual computers having requested XPTLB processing. Alternatively, the IP mask latches BIM1 through BIMn may be implemented by use of a RAM arrangement. The AND gates 111 through 113 compute the logical AND of each of the IP mask latches BIM1 through BIMn with the control line 117 of the XPTLB REQ from an IP being dispatched by a virtual computer, which is shown to be IP0 (103). Of course, each of the IP's can send an XPTLB request and FIG. 1 shows, as an example, the logic in effect when an XPTLB REQ is issued by the IP0. The same logic may also be provided for the IP1 through IPn. The AND gates provide an XPTLB REQ output designating PTLB processing to the other IP's.

Figure 2:
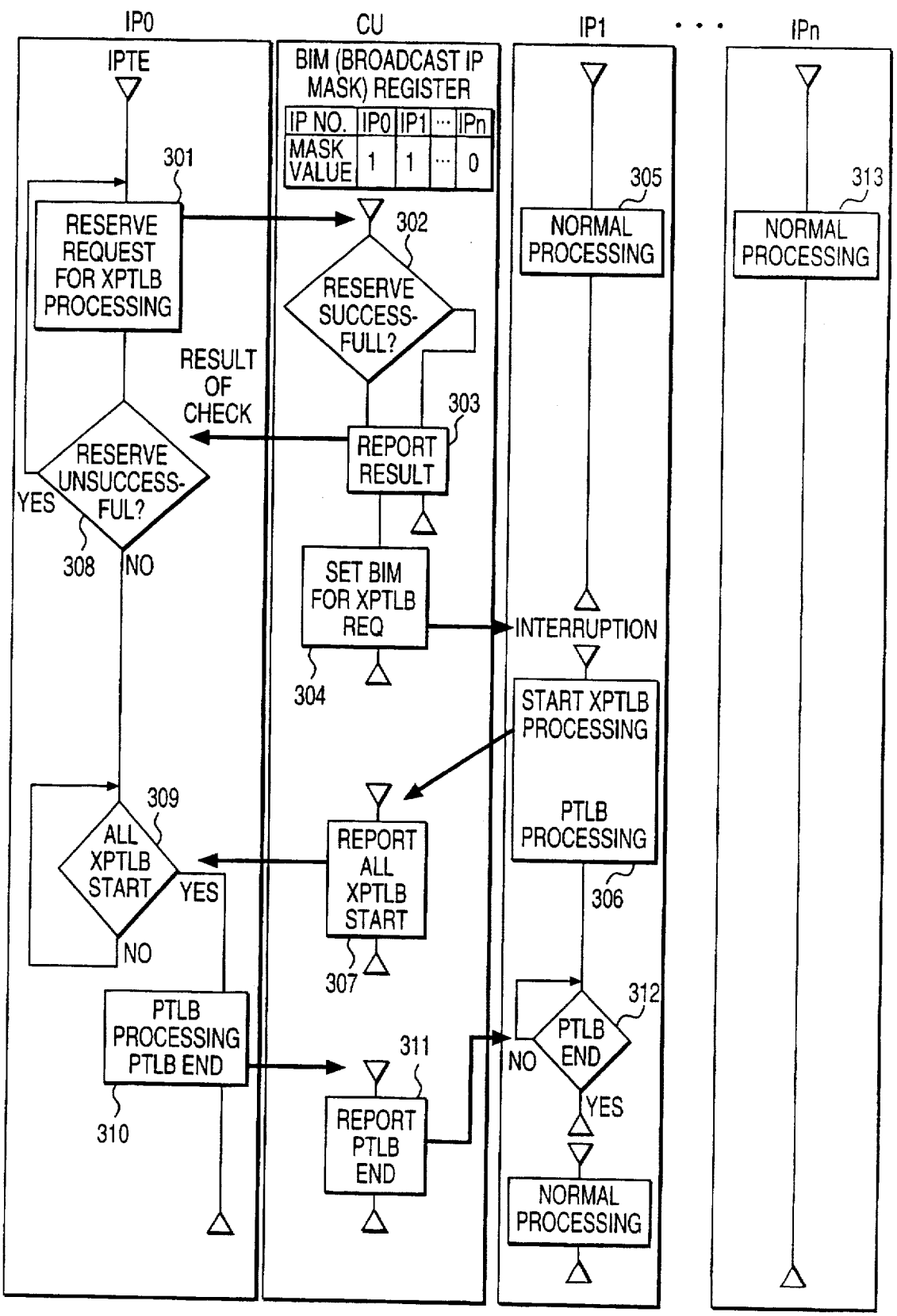
FIG. 2 is a flowchart diagram showing how XPTLB processing is performed upon execution of an IPTE instruction according to the embodiment of the invention.

How the IPTE instruction is executed by the embodiment will now be described with reference to the flowchart diagram of FIG. 2. FIG. 2 is a flowchart showing how XPTLB processing is performed upon execution of an IPTE instruction by the embodiment. For this example, it is assumed that the IP0 is dispatched by one virtual computer and that the virtual computer in question is to execute the IPTE instruction. The diagram of FIG. 2 is explained in detail as follows.

(1) In carrying out the IPTE instruction, the IP0 issues a RESERVE request to the CU preparatory to executing the XPTLB processing on the other IP's, i.e., IP1 through IPn (step 301).

(2) On receiving the RESERVE request, the CU checks to see if it is possible to issue an XPTLB request to the other IP's, i.e., if the other IP's are in XPTLB processing or are issuing any RESERVE request to the CU preparatory to XPTLB processing. The result is reported to the IP0 (steps 302 and 303).

(3) If the processing of the RESERVE request from the IP0 is found to be possible, the CU references the IP dispatch information matrix 107 in the HSA, reads from the matrix 107 the IP dispatch information about the virtual computers sharing the IP that issued the RESERVE request (IP0 in the example of FIG. 2), and sets the retrieved information to the latches BIM1 through BIMn. Thereafter, the CU issues an XPTLB REQ to the IP's whose BIM settings are on. For this example, it is assumed that the IP dispatched previously by the virtual computers sharing the IP0 is IP1 and that the IPn has not been dispatched by the virtual computers currently sharing the IP0. Thus in the IP dispatch information of this example, a "1" (on) is set for the IP0 and IP1; and a "0" (off) is set for the Ipn. The information about the IP1 and that about the IPn are set to the BIM1 and BIMn, respectively, and a "1" (on) and a "0" (off) are set to the BIM1 and BIMn, respectively. The CU gets the AND gates 111 through 113 to compute the logical AND of the XPTLB REQ from the IP0 with each of the BIM1 through BIMn. Thereafter, the CU issues an XPTLB REQ to the IP's for which the information in the BIM1 through BIM is on (i.e., to the IP1 in this example). Whereas a "1" and a "0" in BIM's are assumed to be "on" and "off" respectively with this embodiment, a "1" and a "0" in BIM's may be regarded conversely as "off" and "on," respectively, in an alternative embodiment. Where the BIM settings are on for the IP2 through IPn-1, the processing of these IP's is the same as that of the IP1 and thus will not be discussed further; where the BIM settings are off for the IP2 through IPn-1, the processing of these IP's is the same as that of the IPn and will not be described further as well.

(4) It is understood that the IP1 is currently executing the task assigned thereto (NORMAL PROCESSING 305). Upon receipt of the XPTLB REQ from the CU, the IP1 interrupts the ongoing task processing (INTERRUPTION) and starts XPTLB processing while concurrently sending an XPTLB START report to the CU (step 306). The IPn not receiving the XPTLB REQ from the CU continuously processes its assigned task (NORMAL PROCESSING 313).

(5) The CU receives the XPTLB START report from every IP for which the BIM setting is on and to which the XPTLB REQ was sent. In response, the CU sends an ALL XPTLB START report to the IP0, the originator of the XPTLB REQ, telling the latter that the XPTLB processing of all IP's has started (step 307).

(6) Meanwhile, after issuing the RESERVE request to the CU, the IP0 waits for a report from the CU (RESULT OF CHECK). If the attempt to reserve has failed (YES), the IP0 processing returns to step 301 and issues another RESERVE request to the CU. If the reserve attempt is successful (NO), the IP0 waits for the ALL XPTLB START request from the CU (step 309). When the request is received (YES), the IP0 executes its own PTLB processing. At the end of the PTLB processing, the IP0 sends a PTLB END report to the CU and terminates the processing (step 310).

(7) Upon receipt of the PTLB END report from the IP0, the CU sends to all IP's that performed XPTLB processing a PTLB END report indicating that the PTLB processing by the IP0, the originator of the XPTLB REQ, has ended. The CU then terminates the processing (step 311).

(8) The IPTE instruction is an instruction that inhibits the reference to any TLB entry area by any other IP except the IP that issued the instruction, the inhibition lasting until the latter IP terminates its processing. Thus the IP1 waits in a loop for a PTLB END report from the CU (step 312). When the PTLB END report is received, the IP1 resumes processing of its task (NORMAL PROCESSING).

As described, the embodiment of the invention allows the IPn to execute the task of the virtual computer sharing the IPn without receiving an XPTLB REQ in step 304, i.e., without being interrupted by the XPTLB REQ issued to any other virtual computer.

Figure 3A:
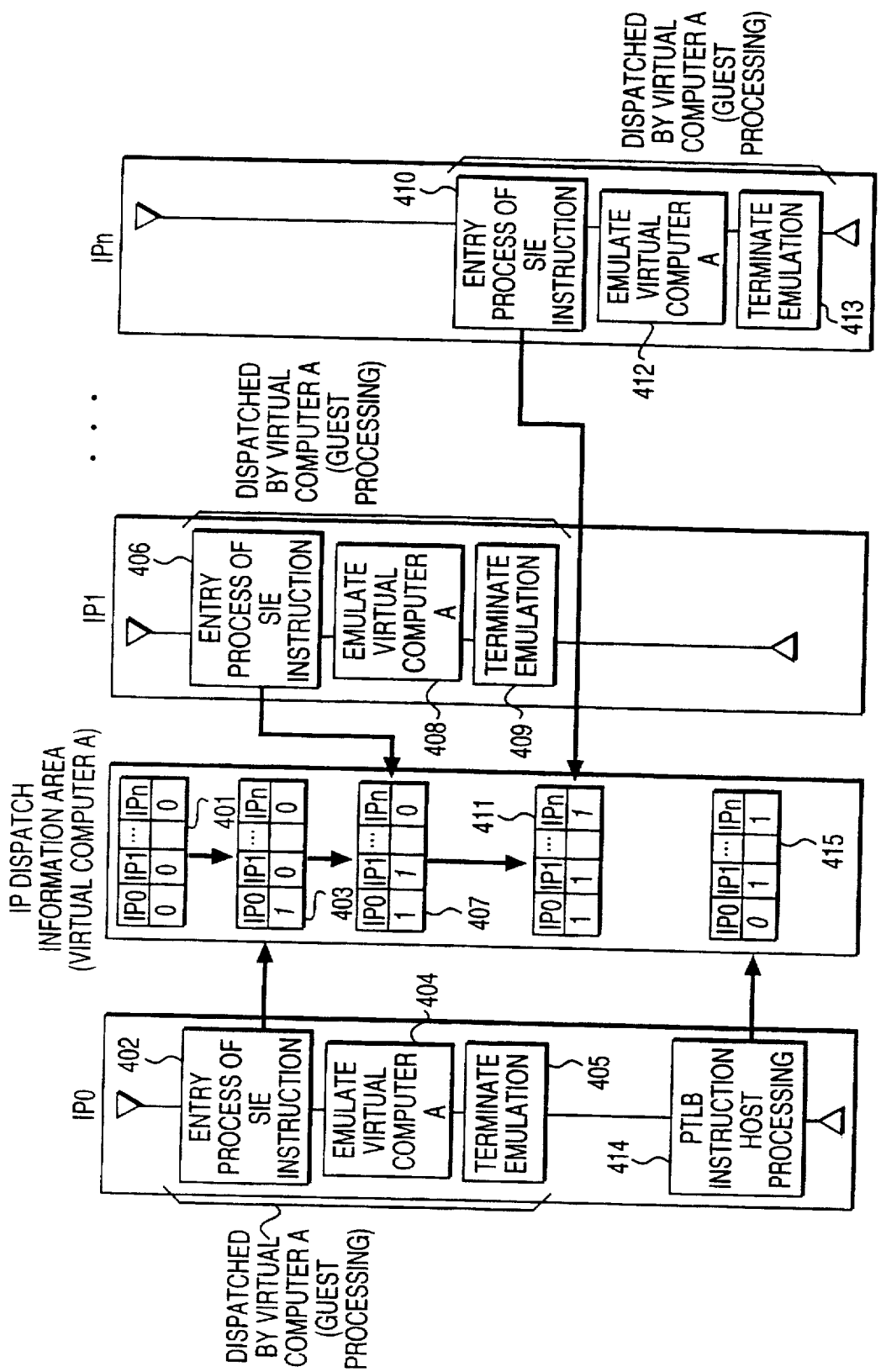
FIG. 3A is a flowchart and FIG. 3B a diagram showing how IP dispatch information is updated in the preferred embodiment of the invention.

Described below with reference to the flowchart of FIG. 3A is how to control the IP dispatch areas of the IP dispatch information matrix 107 in the HSA of the main storage 102. Specifically, FIG. 3A is a flowchart of steps illustrating how IP dispatch information is updated by the embodiment. As mentioned with reference to FIG. 1, the IP dispatch areas are provided corresponding to each of the virtual computers that may be configured. The areas are one bit long each representing the IP0 through IPn, each area containing information indicating whether or not the IP in question has ever been shared by a virtual computer. The example of FIG. 3A shows how the IP dispatch information is updated in connection with a virtual computer A.

(1) For the virtual computer A, the HSA provides IP dispatch information areas regarding the IP0 through IPn. Initially, zeros are set to all areas. The all-zero state indicates that no IP has been dispatched (step 401).

(2) When the virtual computer A dispatches the IP0, i.e., when the IP0 is used to emulate the virtual computer A, the IP0 carries out an SIE instruction. Carrying out the SIE instruction is equivalent to the IP being dispatched by some virtual computer. The SIE instruction, when executed, sets up an environment in which to emulate a virtual computer. Setting up the environment is called an entry process. With this embodiment of the invention, the entry process additionally includes validation (step 402) of the IP dispatch information for the virtual computer in question (in the example of FIG. 3A, the validation concerns the IP0 dispatch information area for the virtual computer A).

(3) The process in step 402 sets "1" to the IP0 dispatch information area for the virtual computer A. This indicates that the IP0 has been dispatched by the virtual computer A (step 403).

(4) After performing the entry process of the SIE instruction, the IP0 emulates the virtual computer A and carries out the task assigned to the latter (step 404). When a host (real computer) requests intervention in the virtual computer or when an execution time allocated under a time slicing scheme has elapsed, the IP0 terminates the emulation of the virtual computer A and resumes host processing (step 405).

(5) A virtual computer is dynamically assigned to each IP. Suppose that the IP1 is allocated as the next IP to be dispatched by the virtual computer A. In that case, the IP1 carries out the entry process of the SIE instruction and performs validation of the IP1 dispatch information area for the virtual computer A (step 406).

(6) The process in step 406 sets "1" to the IP1 dispatch information area for the virtual computer A. This indicates that the IP1 has been dispatched by the virtual computer A (step 407).

(7) After performing the entry process of the SIE instruction, the IP1 emulates the virtual computer A and carries out the task assigned to the latter (step 408). When the host (real computer) requests intervention in the virtual computer or when an execution time allocated under the time slicing scheme has elapsed, the IP1 terminates the emulation of the virtual computer A and resumes host processing (step 409).

(8) If the IPn is allocated in like manner as the next IP to be dispatched by the virtual computer A, the IPn carries out the entry process of the SIE instruction and performs validation of the IPn dispatch information area for the virtual computer A (step 410).

(9) The process in step 410 sets "1" to the IPn dispatch information area for the virtual computer A. This indicates that the IPn has been dispatched by the virtual computer A (step 411).

(10) After performing the entry process of the SIE instruction, the IPn emulates the virtual computer A and carries out the task assigned to the latter (step 412). When the host (real computer) requests intervention in the virtual computer or when an execution time allocated under the time slicing scheme has elapsed, the IPn terminates the emulation of the virtual computer A and resumes host processing (step 413).

The above-described processing brings about validation of the IP dispatch information areas corresponding to the virtual computer in question. In the above example, the IP0, IP1 and IPn dispatch information areas are set for "1" regarding the virtual computer A.

Figure 3B:
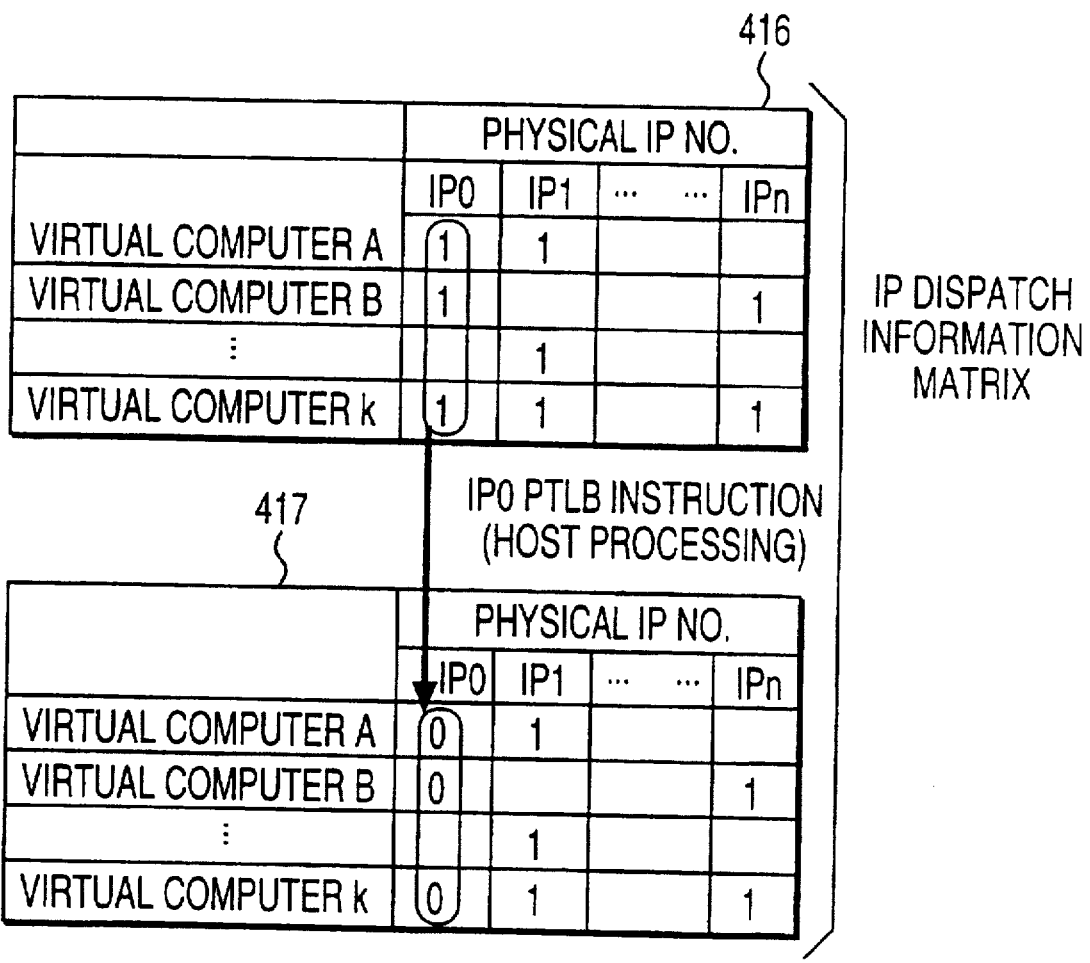
Figure 4:
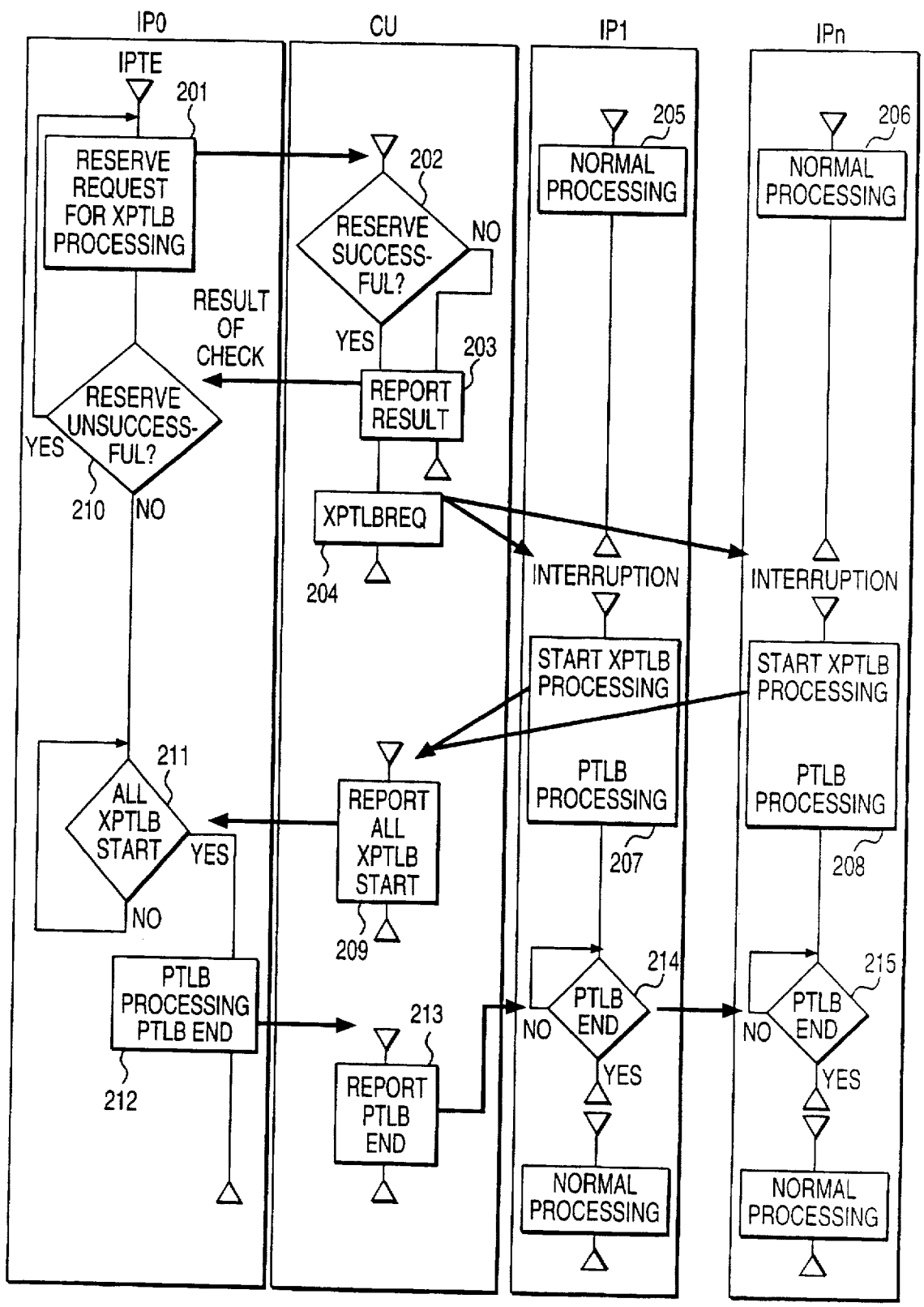
FIG. 4 is a flowchart diagram showing how the IPTE instruction is conventionally executed by each of the data processors in a multi-processor arrangement.

(11) Of the IP dispatch information areas corresponding to virtual computers, the area of the IP corresponding to all virtual computers (IP0 in the example), as indicated by numerals 416 an 417 in FIG. 3B, is invalidated when the host processing of the IP in question (IP0) carries out the PTLB instruction (steps 414 and 415).

Carrying out the PTLB instruction invalidates all information in the entries of the TLB for data processors, as explained in page 272 of the above-cited "Instructions for the HITAC M Series Processors (M/ASA)" (8080-2-146) issued by Hitachi, Ltd. The host processing mentioned above includes purging of the TLB information stored in the IP when the latter has emulated a virtual computer in the past. Thus, upon receipt of an XPTLB request from the virtual computer in question, the PTLB processing is unnecessary and may be eliminated as an object of XPTLB. That is, the IP dispatch information may be invalidated.

The processes in steps 401 through 415 described above make it possible to find the IP which has been dispatched by a virtual computer and which is subject to XPTLB processing. This embodiment of the invention is capable of limiting the IP that executes the XPTLB processing using three means: first means for storing IP dispatch information about virtual computers in an HSA, second means for constituting in the CU a group of bit-map BIM latch registers which correspond to the configured IP's and in which the IP dispatch information is set, and third means for determining the IP that is to issue a request through the BIM masks. In this virtual computer system of a multi-processor arrangement, each virtual computer is allowed to proceed with its processing without being affected by the overhead of the XPTLB processing by the other virtual computers, i.e., free of a break-in attributable to the XPTLB request issued by any other virtual computer, whereby the performance of each virtual computer is enhanced.

As described, the virtual computer system of a multi-processor constitution according to the invention reduces the overhead of XPTLB processing and thereby increases the processing performance of each virtual computer.

We claim:

1. A virtual computer system of a multi-processor arrangement having a plurality of data processors, each of said plurality of data processors including a translation look-aside buffer having a plurality of entries, each of said plurality of entries accommodating a logical address paired with a real address, comprising:

retaining means for retaining dispatch information indicating whether or not each of the data processors has ever been dispatched by a virtual computer; and determining means activated upon receipt of a translation look-aside buffer purge request issued by one of said data processor dispatched by one virtual computer, said determining means determining which of the data processors is to receive a translation look-aside buffer purge request from said one data processor.

2. A virtual computer system according to claim 1, wherein said dispatch information is placed in a hardware area of the main storage shared by said plurality of data processors, and wherein said determining means is provided in a controller that controls the operation of said virtual computer system.

3. A virtual computer system according to claim 2, wherein said determining means includes a group of mask latches in which the dispatch information corresponding to each of said plurality of data processors is set, and wherein said determining means determines which of the data processors is to receive a translation look-aside buffer purge request in accordance with both the information held in the mask latch group and the purge request from the virtual computer dispatched by said one data processor.

4. A virtual computer system of a multi-processor arrangement having a plurality of data processors, each of said plurality of data processors including a translation look-aside buffer having a plurality of entries, each of said plurality of entries accommodating a logical address paired with a real address, comprising:

an IP dispatch information area in a main storage shared by said data processors for retaining dispatch information indicating whether or not each of the data processors has ever been dispatched by a virtual computer; a control unit connected to the main storage area and said data processors that determines upon receipt of a translation look-aside buffer purge request issued by one of said data processors dispatched by one virtual computer which of the data processors is to receive a translation look-aside buffer purge request from said one data processor.

5. A virtual computer system according to claim 4, wherein said dispatch information is placed in a hardware share area of the main storage.

6. A virtual computer system according to claim 5, wherein said control unit includes a group of mask latches in which the dispatch information corresponding to each of said plurality of data processors is set, and wherein said control unit further includes logic circuits that determine which of the data processors is to receive A translation look-aside buffer purge request in accordance with both the information held in the mask latch group and the purge request from the virtual computer dispatched by said one data processor.

7. A virtual computer system according to claim 6, wherein said logic circuit is a plurality of AND gates that logically combine, for each of the data processors, the output of the information held in the mask latch group and the purge request from the virtual computer dispatched by said one data processor.

8. In a virtual computer system of a multi-processor arrangement having a plurality of data processors, each of said plurality of data processors including a translation look-aside buffer having a plurality of entries, each of said plurality of entries accommodating a logical address paired with a real address, a method comprising the steps of:

storing dispatch information indicating whether or not each of the plurality of data processors has ever been dispatched by a virtual computer; and determining upon receipt of a translation look-aside buffer purge request issued by one of said data processor dispatched by one virtual computer, which OF THE data processors is to receive the translation look-aside buffer purge request from said one data processor.

9. A method according to claim 8, further including storing the dispatch information in a hardware storage area of a main storage shared by said plurality of data processors.

10. A method according to claim 9, further including setting the dispatch information in a group of mask latches in respectively corresponding to each of said plurality of data processors, and in said determining step, determining which of the data processors is to receive A translation look-aside buffer purge request in accordance with both the information held in the mask latch group and the purge request from the virtual computer dispatched by said one data processor.

* * * * *